Patented Oct. 26, 1937

2,096,922

UNITED STATES PATENT OFFICE 2,096,922

METHOD OF PREPARING A MINERAL OIL SOLUTION OF DERRIS

Nicholas A. Sankowsky, Scotch Plains, N. J., assignor to Stanco Inc.

No Drawing. Application October 7, 1933, Serial No. 692,708

5 Claims. (Cl. 87—28)

This invention relates to the preparation of solutions of difficultly soluble solids, particularly of solids which are composed of various ingredients that have different degrees of solubility.

Where a desired solvent is used in dissolving organic solids composed of various ingredients, of which some are more soluble than others, difficulty is found in dissolving the more soluble ingredients due to the presence of the less soluble ingredients.

It has been discovered that by using another solvent in which both the desired solvent and the various ingredients are readily soluble, in dissolving the solid and then subjecting the solution to a treatment such as will be described below to remove some of the ingredients, a clear solution of more soluble ingredients is obtained which, either separated from the solvent or together with the solvent, will readily go into solution in the desired solvent.

This process is especially applicable in obtaining mineral oil extracts of plants of the genera Deguelia, Lonchocarpus and Tephrosia, such as Derris, tuba, cube, haiari, etc. These extracts have insecticidal properties. The extractives of these plants are generally obtained by means of leaching with organic solvents such as benzol, ethylene dichloride, chloroform, etc. The solvent is then evaporated and the resulting extractives dissolved in a mineral oil. The solubility of the extractives in the petroleum distillate is very low and very low concentrations of the extractives are thereby obtained due to the residue being a plastic, gummy composition with a major part of the mineral oil soluble extractives covered with a coating of the mineral oil insoluble extractives.

An object of the invention is to treat the extractives of plants of the genera Deguelia, Lonchocarpus and Tephrosia, such as Derris, cube, haiari, etc. so that a more concentrated solution of the active principles of these plants in mineral oil may be obtained.

It has been discovered that by treating a solution of the extractives of plants of the genera Deguelia, Lonchocarpus and Tephrosia, such as Derris, cube, haiari, etc. with freshly burnt fuller's earth or other absorptive or adsorptive clay, the ingredients not soluble in mineral oil are removed and the ingredients soluble in mineral oil remain in solution. The solution may then be dissolved in mineral oil or the solvent evaporated and the residue dissolved in a mineral oil to yield a concentrated solution.

The following examples will illustrate the process:

A plant such as Derris, tuba, cube, haiari, etc. is extracted with a suitable solvent such as ethylene dichloride or chloroform by a countercurrent method, producing a concentrate of about 20 grams of the extractives in 100 cc. of the solvent. This concentrated solution is filtered through freshly burnt fuller's earth which removes ingredients that are not soluble in mineral oil and leaves the mineral oil soluble extractives in solution. This filtering through the fuller's earth also removes other ingredients which are soluble in mineral oil, though of no known effect. The filtrate may then be added to the mineral oil, such as kerosene, white oil, etc. to prepare the solution of desirable concentration. If desired, the filtrate may be subjected to heat to remove the solvent and the residue dissolved in the mineral oil.

In another example, a benzol solution of Derris was thoroughly shaken with freshly burnt fuller's earth and the clay separated by centrifuging, yielding a benzol solution of mineral oil soluble extractives.

This method is applicable, in general, to plant extracts in organic solvents which do not contain water in an amount sufficient to impair the action of the clay.

The treating process can be modified in various other ways without departing from the spirit of this invention as specified in the following claims.

I claim:

1. The process of preparing a mineral oil solution of the extractives of plants of the genera Deguelia, Lonchocarpus and Tephrosia, which comprises extracting said plants with a volatile organic liquid selected from the group consisting of benzol, ethylene dichloride and chloroform, and capable of dissolving out ingredients which are soluble in the mineral oil to be used and also some ingredients insoluble in said mineral oil, said organic liquid being also soluble in said mineral oil, contacting the resulting solution with an adsorptive clay and separating said clay, then incorporating the extractive in the mineral oil.

2. The process of preparing a mineral oil solution of Derris which comprises extracting the soluble ingredients of Derris with ethylene dichloride, contacting the ethylene dichloride solution with freshly burnt fuller's earth, separating the fuller's earth, dissolving the ethylene dichloride solution in a mineral oil and evaporating the ethylene dichloride.

3. The process of preparing a mineral oil solution of Derris which comprises extracting the soluble ingredients of Derris with ethylene dichloride, contacting the ethylene dichloride solution with freshly burnt fuller's earth, separating the fuller's earth, evaporating the ethylene dichloride and dissolving the residue in a mineral oil.

4. The process of preparing a mineral oil solution of Derris which comprises extracting the soluble ingredients of Derris with chloroform, contacting the chloroform solution with freshly burnt fuller's earth, separating the fuller's earth, dissolving the chloroform solution in a mineral oil and evaporating the chloroform.

5. The process of preparing a mineral oil solution of Derris which comprises extracting the soluble ingredients of Derris with benzol, contacting the benzol solution with freshly burnt fuller's earth, separating the fuller's earth, dissolving the benzol solution in a mineral oil and evaporating the benzol.

NICHOLAS A. SANKOWSKY.